(12) United States Patent
Yoshida et al.

(10) Patent No.: US 8,827,533 B2
(45) Date of Patent: Sep. 9, 2014

(54) SPREAD ILLUMINATING APPARATUS WITH LIGHT GUIDING PLATE

(75) Inventors: Takahito Yoshida, Kitasaku-gun (JP); Makoto Furuta, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 141 days.

(21) Appl. No.: 13/414,225

(22) Filed: Mar. 7, 2012

(65) Prior Publication Data
US 2012/0275193 A1 Nov. 1, 2012

(30) Foreign Application Priority Data
Apr. 28, 2011 (JP) ................................. 2011-101641

(51) Int. Cl.
*F21V 7/04* (2006.01)
*F21V 8/00* (2006.01)
(52) U.S. Cl.
CPC ............ *G02B 6/0018* (2013.01); *G02B 6/0083* (2013.01)
USPC ............ 362/628; 362/615; 362/616; 362/621

(58) Field of Classification Search
USPC .................................................. 362/600–634
See application file for complete search history.

(56) References Cited

U.S. PATENT DOCUMENTS

| | | | | |
|---|---|---|---|---|
| 7,182,499 | B2 * | 2/2007 | Chen et al. | 362/621 |
| 2004/0207775 | A1 * | 10/2004 | Min et al. | 349/65 |
| 2007/0165423 | A1 * | 7/2007 | Choi et al. | 362/621 |
| 2007/0195551 | A1 * | 8/2007 | Shin | 362/612 |

FOREIGN PATENT DOCUMENTS

JP    A-2002-42534    2/2002

\* cited by examiner

*Primary Examiner* — William Carter
(74) *Attorney, Agent, or Firm* — Oliff PLC

(57) ABSTRACT

A spread illuminating apparatus includes a point-like light source, and a light guiding plate with a light incident face at which the point-like light source direct and an emission surface that exits spread illuminated light emitted from the point-like source and then introduced through the light incident face. A pair of inclined surfaces is provided between the adjacent point-like light sources arranged at the light incident face, the inclined surfaces being configured to incline and narrow as moving toward a front of the light guiding plate in a light emitted direction.

8 Claims, 3 Drawing Sheets ical display panel, a spread illuminating apparatus with a sidelight system (backlight) where small and environmentally high-suitable LEDs are arranged along a light incident face of a light guiding plate has been widely adopted mainly in a field of small portable information apparatuses such as a mobile phone. In such a spread illuminating apparatus, luminance irregularities, that is, the generation of bright areas in front of each of the LEDs as well as the generation of dark areas between the LEDs, have been noticed that these luminance irregularities tend to occur near the light incident face of the light guiding plate. Conventionally, in order to fix these luminance irregularities, a spread illuminating apparatus with a light incident prism has been proposed, the light incident prism being arranged at the light incident face of the light guiding plate for light diffusion. See, for example, Japanese Patent Application Laid-Open No. 2002-42534.

SPREAD ILLUMINATING APPARATUS WITH LIGHT GUIDING PLATE

BACKGROUND OF THE INVENTION

1. Field of the Invention

The present invention relates to a spread illuminating apparatus, and more particularly to a spread illuminating apparatus with a sidelight system that includes a light guiding plate in which a light source is disposed on a light incident face of the light guiding plate, so that spread illuminated light is emitted from an emission portion of the light guiding plate.

2. Description of the Related Art

As a lighting unit of a liquid crystal display panel, a spread illuminating apparatus with a sidelight system (backlight) where small and environmentally high-suitable LEDs are arranged along a light incident face of a light guiding plate has been widely adopted mainly in a field of small portable information apparatuses such as a mobile phone. In such a spread illuminating apparatus, luminance irregularities, that is, the generation of bright areas in front of each of the LEDs as well as the generation of dark areas between the LEDs, have been noticed that these luminance irregularities tend to occur near the light incident face of the light guiding plate. Conventionally, in order to fix these luminance irregularities, a spread illuminating apparatus with a light incident prism has been proposed, the light incident prism being arranged at the light incident face of the light guiding plate for light diffusion. See, for example, Japanese Patent Application Laid-Open No. 2002-42534.

Along with recent advanced output performances of LEDs, the number of LEDs arranged at light incident faces of a light guiding plate has been reducing in the spread illuminating apparatus. In this case, since an interval between the LEDs adjacent to each other will become longer, dark areas tend to be generated near the light incident face of the light guiding plate. In order to reduce such dark areas, the contour of a light incident prism may be adjusted thereby allowing further light to direct toward the dark areas (that is, diagonally to the front of the LEDs). However, problems to be described hereinbelow may arise anew.

FIG. 4 is a top view illustrating a spread illuminating apparatus 100 that includes a light guiding plate 110 and two LEDs 101a and 101b arranged at a light incident face 102 of the light guiding plate 110. In the light incident face 102, a light incident prism (not shown) is formed. In the spread illuminating apparatus 100, if an interval p between the adjacent LEDs 101a and 101b becomes relatively longer, the contour of the light incident prism needs to be adjusted to diffuse light at further wider angle. With the adjusted contour of the light incident prism, a sufficient amount of light will advance from the LEDs 101a and 101b toward a region (portion A between the adjacent LEDs) that tends to become the dark areas. As a result, for example, light emitted from the LED 101a and diffused by the light incident prism so as to travel into the light guiding plate 110 includes: 1) light (M) that arrives at the portion A and then emitted therefrom; and 2) light (M') that passes through the portion A, arrives at a front region (portion B) of the adjacent LED 101b, and then emitted therefrom. Since the portion B is an area that tends to be originally bright by light emitted from the LED 101b, the brightness of the portion B should be further advanced by light emitted from the LED 101a consequently creating a so-called hot spot. Accordingly, based on arts provided by the spread illuminating apparatus 100, the luminance irregularities should be further increased.

SUMMARY OF THE INVENTION

The present invention has been made in light of the above problems, and an object of the present invention is to provide a spread illuminating apparatus with a sidelight system that improves luminant uniformity positioned near a light incident face of a light guiding plate.

The following aspects of the invention exemplify the structures of the present invention. The aspects are separated to easily understand the various structures of the present invention. Each aspect does not limit a technical range of the present invention and the case where a part of components of each aspect is replaced or deleted, or other components are added in consideration of a best mode to carry out the invention can be included in the technical range of the present invention.

In order to achieve the object described above, according to a first aspect of the present invention, there is provided a spread illuminating apparatus, comprising a point-like light source; and a light guiding plate that includes: a light incident face at which the point-like light source direct; and an emission surface being adapted to exit spread illuminated light that has been emitted from the point-like source and introduced through the light incident face, wherein a pair of inclined surfaces is provided between the adjacent point-like light sources arranged at the light incident face, the inclined surfaces being configured to incline and narrow as moving toward a front of the light guiding plate in a light emitted direction.

In the spread illuminating apparatus thus structured, among light that has been emitted from the point-like light source and then introduced into the light guiding plate through the light incident face, specific light directing toward a region in front of the adjacent point-like light source is reflected by any one of the pair of inclined surfaces. The light can then direct toward the front. Therefore, sufficient amount of light will be suppliable to a region between the adjacent point-like light sources (that is, easily darkened region). This means that light is prevented from directing to a region in front of the adjacent point-like light source (that is, easily brightened region). This can prevent the easily brightened region from being further brightened, so that luminant uniformity near the light incident face of the emission portion of the light guiding plate can be improved.

In the first aspect of the present invention, the point-like light source is mounted on a flexible printed circuit board.

In the spread illuminating apparatus thus structured, the flexible printed circuit board on which the point-like light source is mounted is fixed on the principal surface of the light guiding plate. Accordingly, the point-like light source can be easily positioned relative to the light guiding plate with high precision In the first aspect of the present invention, a claw portion for fixing the flexible printed circuit board is formed at the light guiding plate, the claw portion being positioned between the point-like light source and the inclined surface of the light incident face.

In the spread illuminating apparatus thus structured, when the flexible printed circuit board, on which the point-like light source is mounted, is fixed on the light guiding plate, the flexible printed circuit board is fixed to the claw portion. Therefore, a fixation area at the flexible printed circuit board and the light guiding plate near the point-like light source increases, so that positioning between the light guiding plate and the point-like light source can be well stabilized. Thereby, luminant uniformity near the light incident face of the emission portion of the light guiding plate can be stably maintained over a long period of time.

When considering the spread illuminating apparatus according to the present invention in which the pair of inclined portions are provided between the adjacent point-like light sources of the light incident face, it can be said that the longer an interval between the adjacent point-like light sources becomes, the more easily a sufficient space needed for the claw portion between the point-like light source and the inclined surface will be secured. Based on the above, this type of spread illuminating apparatus is suitable for a structure where the plurality of point-like light sources are arranged along the light incident face at a relatively long interval, for example, a case where high-power LEDs are used as a point-like light source.

In the first aspect of the present invention, the light guiding plate has an inclined portion, the thickness of which decreases from the side of the light incident face to the front, and a base for fixing the flexible printed circuit board is formed on a side where the inclined portion is inclined, the base being formed in a region except an area in front of the point-like light source.

In the spread illuminating apparatus thus structured, when the flexible printed circuit board, on which the point-like light source is mounted, is fixed at the light guiding plate, the flexible printed circuit board is fixed also to the base. Therefore, a fixation area at the flexible printed circuit board and the light guiding plate near the point-like light source increases, so that positioning between the light guiding plate and the point-like light sources can be well stabilized. Accordingly, luminant uniformity near the light incident face of the emission portion of the light guiding plate can be stably maintained over a long period of time. Here, when the flexible printed circuit board is fixed to the base, a gap is formed between the inclined surface placed at the front of the point-like light source and the flexible printed circuit board. Therefore, while direct light absorption by the flexible printed circuit board has been repressing, it is possible for light that has been emitted from the point-like light source to be efficiently guided to the emission portion through the inclined portion.

Further, the point-like light source is preferably formed as that a surface to be mounted on the flexible printed circuit board is configured approximately perpendicular relative to the light emitting surface; the base has a plane approximately orthogonal to the light incident face; and the flexible printed circuit board is mounted on the plane of the base.

Accordingly, while the flexible printed circuit board has been fixing to the plane of the base, the light emitting surface of the point-like light source is adapted to face the light incident face of the light guiding plate to form approximately a parallel relation therebetween. Therefore, light that has been emitted from the light emitting surface of the point-like light source can be efficiently introduced into the light guiding plate. Luminance of the illumination light can be thus increased.

In the first aspect of the present invention, an interval of the adjacent point-like light sources is 13 mm or more.

In the spread illuminating apparatus with the sidelight system, which includes: the point-like light source; and the light guiding plate that has 1) the light incident face at which the point-like light sources are arranged and 2) the emission portion where light emitted from the point-like light source and then introduced into the light incident face becomes the spread tight, luminant uniformity near the light incident face of the light guiding plate will be improved. The present invention is especially advantageous when being applied to the spread illuminating apparatus having the following features: 1) applying high output LEDs as a point light source, and 2) arranging pluralities of LEDs at a relatively long interval along the light incident face of the light guiding plate. With the spread illuminating apparatus having the above features, luminant uniformity near the light incident face of the light guiding plate will be notably improved.

BRIEF DESCRIPTION OF THE DRAWINGS

FIGS. 3A and 3B are top views illustrating the main portion of the spread illuminating apparatus according to the second embodiment of the present invention, in which FIG. 3A is a top view of an FPC and FIG. 3B is a top view of a light guiding plate.

DETAILED DESCRIPTION OF THE PREFERRED EMBODIMENTS

Figure 1:
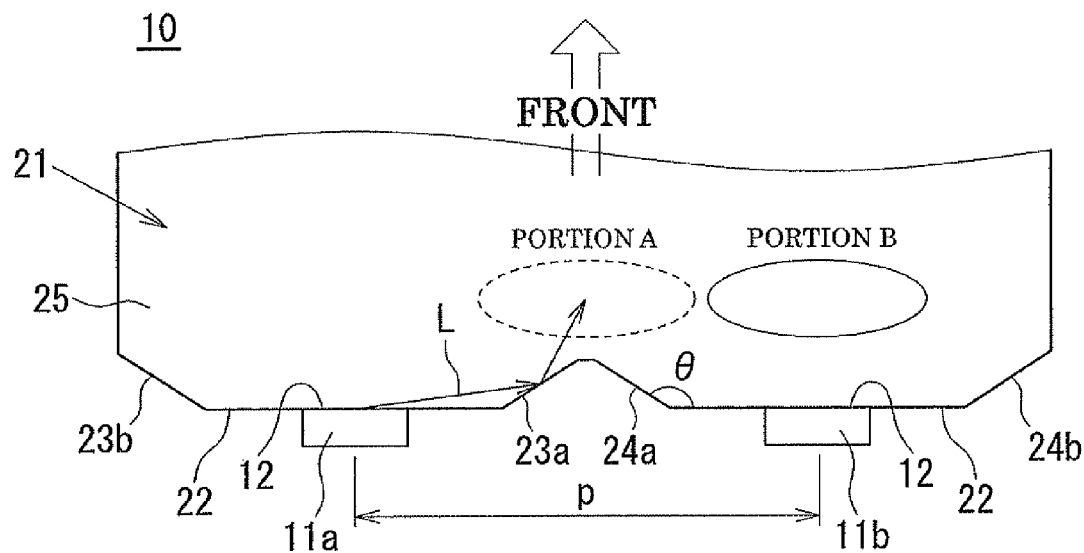
FIG. 1 is a top view illustrating a main portion of a spread illuminating apparatus according to a first embodiment of the present invention.

Hereinafter, some embodiments of the present invention will be described with reference to the attached drawings. FIG. 1 is a top view illustrating one of the main portions of a spread illuminating apparatus 10 according to the embodiment of the present invention.

The spread illuminating apparatus 10 includes LEDs 11a and 11b as a point-like light source, and a light guiding plate 21 allowing that light emitted from the LEDs 11a and 11b exits with spread illuminated light. The light guiding plate 21 is made of a transparent material (for example, polycarbonate resin) and has an approximately rectangular shape in a top view. In addition, the light guiding plate 21 has one side face as a light incident face 22, one principal surface approximately perpendicular to the light incident face 22 as an emission surface 25, and the other principal surface facing the emission surface 25 as a reflection surface (not shown).

Each of the LEDs 11a and 11b uses a pseudo white LED that has a relatively high power. The LEDs 11a and 11b are arranged along the light incident face 22 at a given interval p from each other in such a manner that a light emitting surface 12 of each of the LEDs 11a and 11b face toward the light incident face 22 of the light guiding plate 21. In the spread illuminating apparatus 10, the predetermined interval p is set to have 13 mm or more.

Hereinbelow, a direction to which the light emitting surface 12 of each of the LEDs 11a and 11b face is defined as "FRONT." See FIGS. 1 and 3.

In the spread illuminating apparatus 10, the light incident face 22 has a pair of inclined surfaces 23a and 24a that are formed between the adjacent LEDs (between the LED 11a and the LED 11b) such that the interval of the inclined surfaces 23a and 24a will narrow as moving to the FRONT. Accordingly, a concave portion, which dents to form a valley relative to a flat portion at which the LEDs 11a and 11b are arranged, is formed at the light incident face 22. At this time, the inclined angle θ of the inclined surfaces 23a and 24a may be preferably set between 100° and 160°. Here, the inclined angle means an obtuse angle that is each formed by the flat portion and the inclined surfaces 23a and 24a, as illustrated in FIG. 1.

In the spread illuminating apparatus 10, although not illustrated in the drawing, at least areas on the light incident face 22 that the light emitting surfaces 12 of the LEDs 11a and 11b face, light incident prisms should be formed. Light that has been emitted from the light emitting surfaces 12 is then introduced into the light guiding plate 21 while diffusing at a wide angle relative to a plane parallel to the emission surface 25.

In the spread illuminating apparatus 10, light L is emitted from the LED 11a, diffused by the light incident prism, and traveled in the light guiding plate 21. The light L then diagonally forwards to the side of the adjacent LED 11b and is reflected by the inclined surface 23a. The optical path defined by the light L is then changed so as to direct more in the FRONT (that is, a portion A). This means that light that has been emitted from the LED 11a is prevented from reaching to a portion B (in FIG. 1, the region being in front of the LED 11b. Thus, the potion B to be unnecessarily bright (over luminous intensity) will not become further brighter. Instead, more light becomes suppliable to the portion A between the LED 11a and the LED 11b which tends to be unnecessarily shadowy. Luminant uniformity at the light incident face 22 will be thus further improved.

Needless to say, the inclined surface 24a will have the identical function and effect with the inclined surface 23a when light emitted form the LED 11b is reflected by the inclined surface 24a. In the spread illuminating apparatus 10, an inclined surface 23b that has the same configuration as the inclined surface 24a is formed at a side opposite to the LED 11b, and an inclined surface 24b that has the same configuration as the inclined surface 23a is formed at a side opposite to the side of the LED 11a (see FIG. 1). This structure is preferable because luminant uniformity near the light incident face 22 is improved while the symmetry of a luminance distribution with respect to the LEDs 11a and 11b is maintained.

In the above spread illuminating apparatus 10, the light incident prism has been provided on the light incident face 22 of the light guiding plate 21. However, as long as light emitted from the light emitting surface 12 of the LEDs 11a and 11b can be introduced into the light guiding plate 21 and emitted with spread illuminated light relative to a plane parallel to the emission surface 25, any means instead of the light incident prism is applicable if being able to realize light distribution properties that the present invention expects. Here, it is, for example, possible that the LEDs 11a and 11b themselves may optionally have an internal mechanism that has the above light distribution properties. On the other hand, a prism member independent from the light guiding plate 21 may be arranged between the light emitting surfaces 12 of the LEDs 11a and 11b and the light incident face 22 of the light guiding plate 21.

Figure 2:
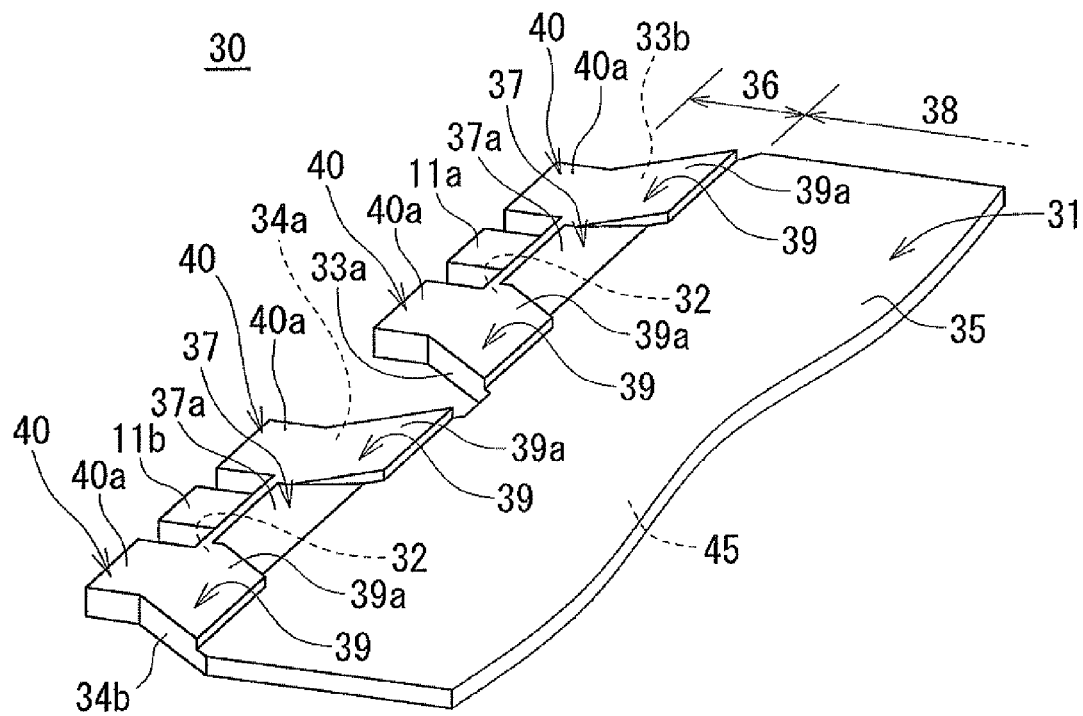
FIG. 2 is a perspective view illustrating a main portion of a spread illuminating apparatus according to a second embodiment of the present invention.

Next, a spread illuminating apparatus 30 according to a second embodiment of the present invention will be described with reference to FIG. 2 and FIGS. 3A and 3B. The spread illuminating apparatus 30 includes LEDs 11a and 11b as a point-like light source, and a light guiding plate 31 that allows emitting light irradiated from the LEDs 11a and 11b with spread illuminated light. The light guiding plate 31 is formed to have an approximately rectangular shape in a top view, and made of a transparent material (for example, polycarbonate resin). In addition, the light guiding plate 31 includes one side face thereof as a light incident face 32, one principal surface approximately perpendicular relative to the light incident face 32 as an emission surface 35, and the other principal surface facing the emission surface 35 as a reflection surface 45.

The LEDs 11a and 11b are arranged along the light incident face 32 at a given interval in such a manner that the light emitting surface 12 thereof faces the light incident face 32 of the light guiding plate 31. In the spread illuminating apparatus 30, the light incident face 32 has a pair of inclined surfaces 33a and 34a that are formed between the adjacent LEDs (between the LED 11a and the LED 11b) such that the interval of the inclined surfaces 33a and 34a narrows as moving toward the FRONT. Accordingly, a concave portion, which dents to form a valley relative to a flat portion at which the LEDs 11a and 11b are arranged, is formed in the light incident face 32.

In the spread illuminating apparatus 30, similar to the spread illuminating apparatus 10, each of the LEDs 11a and 11b may be configured with a pseudo white LED that has relatively high power, and a given interval between the adjacent LEDs 11a and 11b may be set to have 13 mm or more. In addition, these inclined angles of inclined surfaces 33a and 34a may be set to have 140° to 150°. In the spread illuminating apparatus 30, an inclined surface 33b that has the same shape as the inclined surface 34a is formed at a side opposite to the LED 11b, and an inclined surface 34b that has the same shape as the inclined surface 33a is formed at a side opposite to the LED 11a. See FIG. 3B.

Here, needless to say, the spread illuminating apparatus 30 thus configured can achieve the same function and effect with the spread illuminating apparatus 10, The specific configuration, function, and operational advantages of the spread illuminating apparatus 30 according to this embodiment will be described below. In the spread illuminating apparatus 30, the LEDs 11a and 11b are mounted on a flexible printed circuit board (hereinafter, referred to as an FPC) 41 as illustrated in FIG. 3A. Each of the LEDs 11a and 11b is a so-called side view type LED that is formed into a rectangular solid, and has a light emitting surface 12 on one side surface thereof. Here, the surface (mounting surface) of each of the LEDs 11a and 11b on which the FPC 41 is mounted and the light emitting surface 12 are approximately orthogonal to each other.

The light guiding plate 31 includes a light incident portion 36 that is formed in front of the light incident face 32, and an emission portion 38 that is continuously formed from the light incident portion 36. Light that has been guided from the light incident portion 36 can be thus emitted from the emission surface 35 of the light guiding plate 31. The light incident portion 36 has an inclined portion 37, the thickness of which decreases as moving toward the FRONT. The inclined portion 37 is configured with an inclined surface 37a, the inclined surface 37a being inclined at a constant gradient as moving toward the reflection surface 45. Here, the inclined surface 37a is formed along a longitudinal direction of the light incident face 32. The emission portion 38 may be formed into a rectangular plate with a constant thickness, and an optical path conversion pattern may include, for example, a plurality of dots, and formed on the side of the reflection surface 45.

In addition, at both lateral sides of the inclined surface 37a of the inclined portion 37, four bases 39 for fixing the FPC 41 are formed in a flat table shape, each of the bases 39 being separated from each other in order to be not present in front of the LEDs 11a and 11b. Here, each base 39 is configured as that an interval of the two adjacent bases 39 with the LED 11a interposed therebetween as well as an interval of the two adjacent bases 39 with the LED 11b interposed therebetween are widened as moving toward the FRONT.

In the light incident face 32 of the light guiding plate 31, claw portions 40 that protrude rearward relative to the light incident face 32 are integrally configured with the light guiding plate 31. Similar to the bases 39, the claw portions 40 will fix and arrange the FPC 41 and be formed into a rectangular solid as that the claw portions 40 extend rearward from both sides of the incident face 32 to which the LEDs 11a and 11b direct, specifically, from regions between the LED 11a and the inclined surface 33a, between the LED 11a and the inclined surface 33b, between the LED 11b and the inclined surface 34a, and between the LED 11b and the inclined surface 34b. The claw portion 40 is formed such that a top surface 40a thereof is approximately on the same surface as a top surface 39a of the base 39.

The light incident portion 36 of the light guiding plate 31 may have a plane continuous to one side of the inclined surface 37a on the light incident face 32 side. In this case, the plane is formed on the same surface as the top surface 39a of the base 39 and the top surface 40a of the claw portion 40.

Figure 3A:
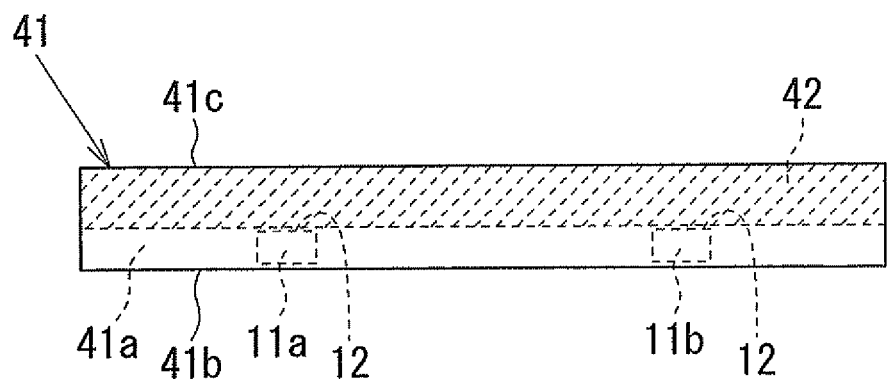
Figure 3B:
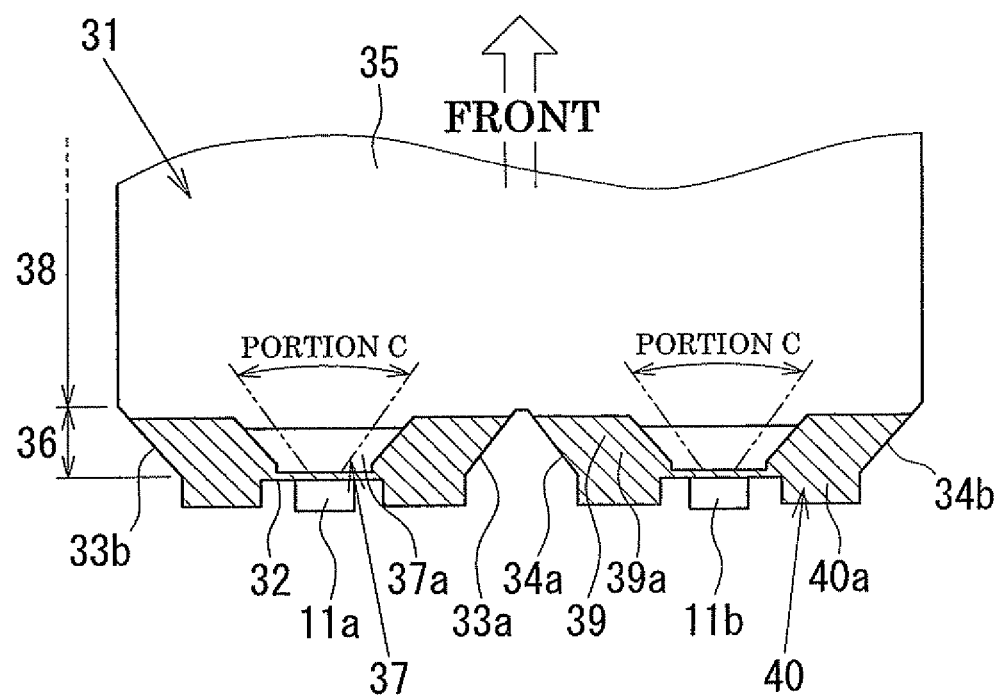
Figure 4:
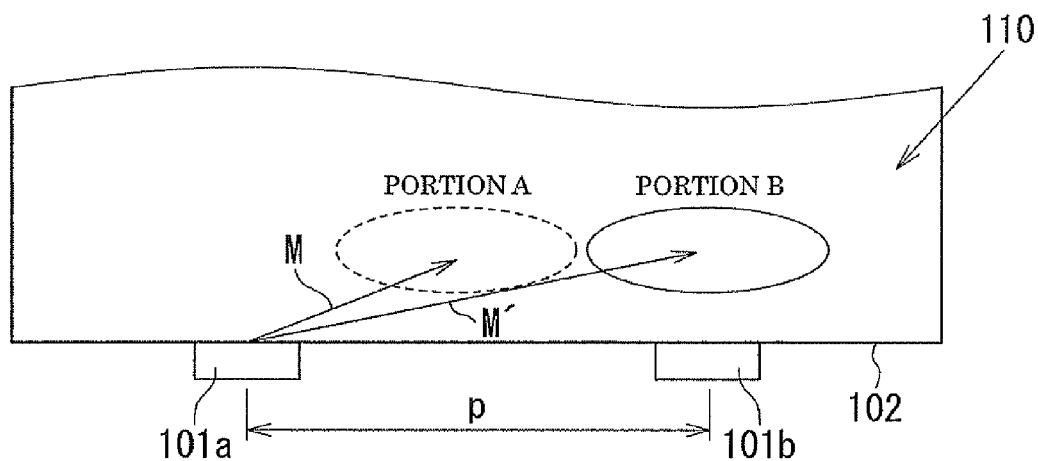
FIG. 4 is a top view illustrating one example of conventional spread illuminating apparatuses.

As illustrated in FIG. 3A, the FPC 41 is formed in a strip shape and is formed such that a dimension of the long side thereof is approximately the same as a dimension of a longitudinal direction of the light incident face 32 of the light guiding plate 31. On a mounting plane 41a, one plane of the FPC 41, the LEDs 11a and 11b are mounted such that the light emitting surface 12 is placed approximately perpendicular to the mounting plane 41a and is placed approximately parallel to the long side.

The FPC 41 mounted with the LEDs 11a and 11b is fixed on the light guiding plate 31 while being positioned such that the light emitting surfaces 12 of the LEDs 11a and 11b face the predetermined position (between the adjacent claw portions 40 and 40) of the light incident face 32 of the light guiding plate 31. At this time, the top surface 39a of the base 39 and the top surface 40a of the claw portion 40 (and the plane of the side of the light incident face of the light incident portion 36, when the plane exists) become a bonding surface (corresponding to a hatching portion of FIG. 3B) with the mounting plane 41a of the FPC 41. The FPC 41 and the light guiding plate 31 may be fixed optionally with adhesive or adhesion materials (for example, double-sided tape). In this case, a concave portion for depositing the adhesive or adhesion materials may be provided on a specific portion of the bonding surface whereby a part of the bonding surface and the mounting plane 41a of the FPC 41 can be partially bonded.

Considering the FPC 41 in this embodiment, a light absorbing member 42 (such as a black coating material) is applied to the front side of the mounting plane 41a (on the side of the long side 41c), thereby being able to absorb light that has been leaked from the light guiding plate 21 (especially from the inclined portion 37). While the FPC 41 has been fixing relative to the light guiding plate 31, the light absorbing member 42 is applied in a strip shape as that at least a part of the inclined surface 37a and a portion near the inclined surface 37a of the emission surface 35 (corresponding to a hatching portion illustrated by a broken line in FIG. 3A) are coated therewith. The FPC 41 may be applied with a light reflecting member (for example, a white coating material), instead of the light absorbing member, so that light that has been leaked from the inclined portion 37 may be used as effective light (illumination light).

In the spread illuminating apparatus 30 thus structured, the light incident portion 36 with the inclined portion 37 is provided. The thickness of the emission portion 38 of the light guiding plate 31 decreases without depending on the thickness of the LEDs 11a and 11b (thickness of the light incident face 32 of the corresponding light guiding plate 31).

Further, a gap may be formable between the inclined surface 37a of the front portion of the LEDs 11a and 11b and the mounting plane 41a of the FPC 41 when the FPC 41 is fixed to the bases 39. Light that has been guided into the light guiding plate 31 will be thus preventable from being directly absorbed by the FPC 41.

Light that has been emitted from the LEDs 11a and 11b will direct in the FRONT so as to advance toward the light guiding plate 31. Here, as illustrated with the portion C in FIG. 3B, light will become spread illuminated light as moving toward the FRONT. Here, each of the bases 39 are formed as that the interval of the two adjacent bases 39 with the LED 11a therebetween and the interval of the two adjacent bases 39 with the LED 11b therebetween become each widened as moving toward the FRONT. Accordingly, areas to be occupied by the top surface 39a of the base 39 increase as much as possible, so that fixation strength between the FPC 41 and the light guiding plate 41 is improved.

In addition, in the spread illuminating apparatus 30, the FPC 41 is fixed to the bases 39, and the light emitting surfaces 12 of the LEDs 11a and 11b are adapted to face the light incident face 32 of the light guiding plate 31, being approximately parallel to each other. Thereby, even though the light incident portion 36 of the light guiding plate 31 has the inclined portion 37, the FPC 41 becomes fixable to the light guiding plate 31, and light that has been emitted from the LEDs 11a and 11b can be efficiently introduced into the light guiding plate 31 with no leakage. The luminance of the illumination light can be thus further increased.

The spread illuminating apparatuses 10 and 30 according to the first and second embodiments may have optional components that have not described hereinabove. These are, for example, a frame to store the components, an optical member such as diffusion sheets or prism sheets stacked on the sides of the emission surfaces 25 and 35 of the light guiding plates 21 and 31, and reflection sheets disposed on the sides of the reflection surfaces 45 of the light guiding plates 21 and 31 (a reference numeral is omitted with respect to the light guiding plate 21).

The present invention has been described based on the preferred embodiments; however, the present invention is not limited thereto. In the spread illuminating apparatus 30, the spread illuminating apparatus are provided with both inclined portions 37 and the claw portions 40. Instead of these structures, the spread illuminating apparatus of the present invention is allowed to have either the inclined portions 37 or the claw portions 40. Further, the spread illuminating apparatus of the present invention may be provided with the inclined portion 37 without the base 39. Still further, the FPC 41 may be adhesively fixed to the reflection surface 45 of the light guiding plate 31.

Each of the spread illuminating apparatuses 10 and 30 includes two pieces of the LEDs 11a and 11b as a point-like light source. However, the number of the point-like light sources is of course modifiable into any desirable numbers.

What is claimed is:

1. A spread illuminating apparatus, comprising:
 a point-like light source; and
 a light guiding plate that includes:
  a light incident face to which the point-like light source direct;
  an emission surface being adapted to exit spread illuminated light that has been emitted from the point-like source and introduced through the light incident face; and
  a principal surface, wherein:
   a pair of light-direction changing inclined surfaces are arranged at the light incident face and provided between adjacent point-like light sources, the light-direction changing inclined surfaces being configured to each have an inclination starting from the emission surface and extending all the way to the principal surface that is facing the emission surface, and to narrow as moving toward a front of the light guiding plate, the light guiding plate has an inclined portion, the thickness of which decreases from a side of the light incident face to the front, and a base for fixing a flexible printed circuit board is formed on the inclined portion integrally formed on the light guiding plate, the base being formed in a region that does not include an area in front of the point-like source.

2. The spread illuminating apparatus according to claim 1, wherein the point-like light source is mounted on a flexible printed circuit board, and the flexible printed circuit board is configured to be fixed on the light guiding plate.

3. The spread illuminating apparatus according to claim 2, wherein a claw portion for fixing the flexible printed circuit board is formed at the light guiding plate, the claw portion being positioned between the point-like light source and the inclined surfaces of the light incident face.

4. The spread illuminating apparatus according to claim 3, wherein the base for fixing the flexible printed circuit board is formed on a side where the inclined portion is inclined.

5. The spread illuminating apparatus according to claim 4, wherein an interval of the adjacent point-like light sources is 13 mm or more.

6. The spread illuminating apparatus according to claim 3, wherein an interval of the adjacent point-like light sources is 13 mm or more.

7. The spread illuminating apparatus according to claim 2, wherein an interval of the adjacent point-like light sources is 13 mm or more.

8. The spread illuminating apparatus according to claim 1, wherein an interval of the adjacent point-like light sources is 13 mm or more.

\* \* \* \* \*